(12) United States Patent
Domova et al.

(10) Patent No.: US 11,988,332 B2
(45) Date of Patent: May 21, 2024

(54) METHOD AND SYSTEM FOR CONTROLLING PERSONAL PROTECTIVE EQUIPMENT

(71) Applicant: ABB Schweiz AG, Baden (CH)

(72) Inventors: Veronika Domova, Västerås (SE); Claire Pitois, Sundbyberg (SE); Henrik Hillborg, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/905,135

(22) PCT Filed: Feb. 25, 2021

(86) PCT No.: PCT/EP2021/054674
§ 371 (c)(1),
(2) Date: Aug. 26, 2022

(87) PCT Pub. No.: WO2021/170714
PCT Pub. Date: Sep. 2, 2021

(65) Prior Publication Data
US 2023/0106865 A1   Apr. 6, 2023

(30) Foreign Application Priority Data
Feb. 27, 2020   (EP) .................................... 20159856

(51) Int. Cl.
*F16P 3/14*   (2006.01)
*G06K 7/10*   (2006.01)
(Continued)

(52) U.S. Cl.
CPC .......... *F16P 3/142* (2013.01); *G06K 7/10386* (2013.01); *G06K 7/1097* (2013.01);
(Continued)

(58) Field of Classification Search
CPC ............................. G07C 9/00571; F16P 3/142
See application file for complete search history.

(56) References Cited

U.S. PATENT DOCUMENTS

| | | | |
|---|---|---|---|
| 10,600,138 B2 * | 3/2020 | Stortstrom | G06V 20/653 |
| 2009/0040014 A1 * | 2/2009 | Knopf | E04G 21/32 |
| | | | 340/5.1 |
| 2009/0161918 A1 | 6/2009 | Heller et al. | |

FOREIGN PATENT DOCUMENTS

| | | | | |
|---|---|---|---|---|
| EP | 2653772 A1 | 10/2013 | | |
| RU | 2622505 C1 * | 6/2017 | ............. | A62B 99/00 |

(Continued)

OTHER PUBLICATIONS

Gheisari, Masoud, et al; "Applications and requirements of unmanned aerial systems (UASs) for construction safety"; Safety Science, vol. 118; Elsevier, Ltd.; Oct. 1, 2019; 11 Pages.
(Continued)

*Primary Examiner* — Daniell L Negron
(74) *Attorney, Agent, or Firm* — Whitmyer IP Group LLC

(57) ABSTRACT

A method for controlling personal protective equipment. The method includes positioning of a person equipped with personal protective equipment next to an electrical enclosure, wherein a specific personal protective equipment requirement is defined for the electrical enclosure. The method further includes scanning the personal protective equipment in a contact-less manner while the person is next to the electrical enclosure. Thereby scanned personal protective equipment information are generated. The method further includes comparing the scanned personal protective equipment information with the specific personal protective equipment requirement and evaluating, based on the comparison, whether the personal protective equipment is in accordance with the specific personal protective equipment requirement. The method further includes providing a feed-
(Continued)

back indicating whether or not the personal protective equipment is in accordance with the specific personal protective equipment requirement.

17 Claims, 2 Drawing Sheets

(51) Int. Cl.
| | |
|---|---|
| G06V 10/22 | (2022.01) |
| G06V 10/75 | (2022.01) |
| G06V 20/64 | (2022.01) |
| G07C 9/00 | (2020.01) |
| G08B 5/36 | (2006.01) |
| B64U 101/55 | (2023.01) |

(52) U.S. Cl.
CPC ............ *G06V 10/22* (2022.01); *G06V 10/757* (2022.01); *G06V 20/653* (2022.01); *G07C 9/00571* (2013.01); *G08B 5/36* (2013.01); *B64U 2101/55* (2023.01); *B64U 2201/10* (2023.01)

(56) References Cited

FOREIGN PATENT DOCUMENTS

| | | | |
|---|---|---|---|
| WO | 2009020765 | A1 | 2/2009 |
| WO | 2017164886 | A1 | 9/2017 |
| WO | 2019058379 | A1 | 3/2019 |

OTHER PUBLICATIONS

Extended European Search Report; Application No. 20159856.2; Completed: Jul. 21, 2020; dated Jul. 30, 2020; 9 Pages.

Nath, Nipun, D. et al.; "Deep learning for site safety: Real-time detection of personal protective equipment"; Automation in Construction, vol. 112; Elsevier Ltd.; Amsterdam, NL; Jan. 17, 2020; 20 Pages.

International Search Report and Written Opinion of the International Searching Authority; PCT/EP2021/054674; Completed: Mar. 25, 2021; dated Apr. 1, 2021; 6 Pages.

PCT Notification Concerning Submission, Orientation or Transmittal of Priority Document; Application No. PCT/EP2021/054674; dated Mar. 8, 2021; 1 Page.

European Office Action; Application No. 20 159 856.2; Completed: May 25, 2023; 9 Pages.

\* cited by examiner

METHOD AND SYSTEM FOR CONTROLLING PERSONAL PROTECTIVE EQUIPMENT

TECHNICAL FIELD

Aspects of the present application generally relate to a method for controlling personal protective equipment, in particular, for a person intending to work with an electrical enclosure. The method is, in particular, carried out before the person starts to work with electrical equipment inside the electrical enclosure. The method comprises, in particular, the evaluation whether the personal protective equipment of the person is in accordance with specific requirements for personal protective equipment associated with the electrical enclosure. Aspects of the present application also relate to a corresponding system for controlling personal protective equipment.

BACKGROUND

When working with electrical equipment various risks may be present. One of the common dangers is the so-called arc flash, i.e. a type of electrical explosion. When an uncontrolled arc forms at high voltages, it can produce deafening noises, supersonic concussive-forces, superheated shrapnel, temperatures far greater than the Sun's surface, and intense, high-energy radiation capable of vaporizing nearby materials. The effects of an arc flash on a human can be burns of the third degree or even death.

In practice, workers who are subjected to those risks are often provided with safety protocols specifying personal protective equipment (PPE) which can be used to effectively shield a worker from the radiation of an arc flash or similar risks.

In the buildings where such workers are active, mirrors are sometimes set up to help the workers to check whether they are wearing the necessary PPE.

However, it can be difficult to ensure that a worker follows the particular safety protocols. In reality, the PPE requirements may be sometimes neglected, e.g. due to time pressure or lack of safety culture. Not a surprise that now and again workers ignore, underestimate or forget the requirements by not wearing adequate PPE, what occasionally can lead to injuries.

SUMMARY

The present invention intends to overcome at least some of the above problems. The object is solved by the method and by the system according to the claims. Further advantages, features, aspects and details of the invention are evident from the dependent claims, the description and the drawings.

The method according to an aspect of the disclosure aims controlling of a person's personal protective equipment (PPE). In particular, the method aims controlling the presence of required PPE for a person who is going to work with an electrical enclosure.

The method comprises positioning of the person equipped with PPE next to the electrical enclosure, for which a specific PPE requirement is defined. The method further comprises scanning the PPE in a contact-less manner while the person is next to the electrical enclosure, thereby generating scanned PPE information. The method further comprises comparing the scanned PPE information with the specific PPE requirement and evaluating, based on the comparison, whether the PPE is in accordance with the specific PPE requirement. The method further comprises providing a feedback indicating whether or not the PPE is in accordance with the specific PPE requirement.

The proposed method may have a wide range of application, is relatively cost-effective and can be used flexibly. With the proposed method, it is possible to improve the possibilities of control of PPE that must be worn by a person.

The system for controlling PPE comprises an electrical enclosure for which a specific PPE requirement is defined, PPE, a scanning unit configured to scan the PPE in a contact-less manner and to generate scanned PPE information thereby. The system further comprises an evaluation unit configured to compare the PPE information with the PPE requirement and to evaluate, based on the comparison, whether the PPE is in accordance with the specific PPE requirement. The system further comprises a feedback unit configured to indicate whether or not the personal protective equipment is in accordance with the specific personal protective equipment requirement.

The proposed method and system may avoid that safety rules can be easily ignored and, thus, may prevent several injuries.

BRIEF DESCRIPTION OF THE DRAWINGS

The invention will be better understood by reference to the following description of embodiments of the disclosure taken in conjunction with the accompanying drawings, wherein.

DETAILED DESCRIPTION

Figure 1:
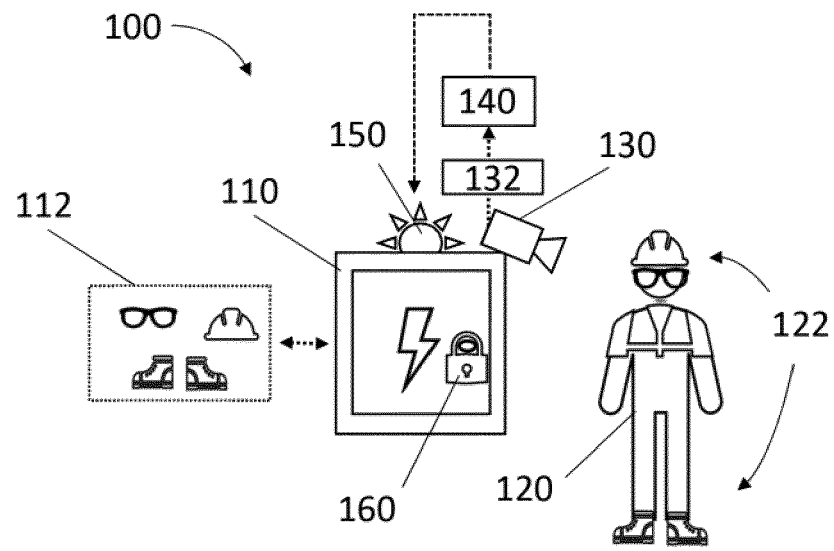
FIG. 1 shows schematically a system for controlling PPE used in a method according to a first embodiment of the invention.

FIG. 1 shows schematically a system 100 for controlling PPE. The system 100 may be used in a method according to the claims.

FIG. 1 shows a person 120 positioned next to an electrical enclosure 110. The person 120 is equipped with personal protective equipment (PPE) 122. The electrical enclosure 110 has a specific PPE requirement 112. The specific PPE requirement may be defined by a safety protocol for each person wanting to have access to the electrical enclosure 110. For example, FIG. 1 illustrates the specific PPE requirement 112 as the necessity of wearing a certain helmet, eye protection and footwear.

While the person 120 is next to the electrical enclosure 110, a scanning unit 130 scans the PPE 122 of the person 120 in a contact-less manner. As illustrated in FIG. 1 the scanning unit 130 may be attached to the electrical enclosure. However, the scanning unit may also be attached to another entity. In FIG. 1, the scanning unit 130 is illustrated as an optical detector. For example, the scanning unit 130 may comprise one or more cameras. The optical detector may visually scan the PPE 122. A visual scan may ensure that the PPE 122 is not just nearby, but that the person 120 is equipped with the scanned PPE.

In addition, or alternatively, the scanning unit may comprise one or more RFID reader which is described in more detail below.

The scanning unit 130 generates scanned PPE information 132 while scanning the PPE 122. For example, an optical detector may provide image recognition of the person's image from head till feet. An optical detector may provide facial recognition of the person's image.

The scanned PPE information 132 may be transferred to an evaluation unit 140. The evaluation unit 140 may compare the scanned PPE information 132 with the specific PPE requirement 112. Based on the comparison the evaluation unit 140 may evaluate whether the PPE 122 of the person 120 is in accordance with the specific PPE requirement 112.

An outcome of the evaluation may be transferred to a feedback unit 150, e.g. a screen or light source(s). As illustrated in FIG. 1 the feedback unit 150 may be attached to the electrical enclosure. However, the feedback unit 150 may also be attached to another entity.

If the specific PPE requirement 112 is met, i.e. if the person wears the required PPE, the feedback unit 150 may provide a feedback indicating that the PPE is in accordance with the specific PPE requirement. If the specific PPE requirement 112 is not met, e.g. if the person wears misses a component of the required PPE, the feedback unit 150 may provide a feedback indicating that the PPE is not in accordance with the specific PPE requirement. For example, the feedback unit 150 may provide a visual feedback. For example, the feedback unit 150 may comprise a light source as illustrated in FIG. 1. The light source may only illuminate if the specific PPE requirement 112 is met. Alternatively, the light source may only illuminate if the specific PPE requirement 112 is not met. Alternatively, the feedback unit 150 may provide a color code indicating whether the specific PPE requirement 112 is met or not, e.g. a green light for "met" and a red light for "not met". Further aspects regarding a feedback are further described below.

In addition to the feedback unit 150 or as an alternative feedback unit, a locking mechanism 160 may be provided. For example, the electrical enclosure 110 may comprise a door. The door may be locked. The locked door may prevent access to the inside of the electrical enclosure 110.

A person 120 equipped with PPE 122 that is not in accordance with the specific PPE requirement 112 of the electrical enclosure 110 may not be able to open the door of the electrical enclosure 110. This prevents anyone equipped with inadequate PPE from gaining access to a source of danger.

If the person 120 is equipped with PPE 122 that is in accordance with the specific PPE requirement 112 of the electrical enclosure 110, the locked door of the electrical enclosure 110 may be unlocked. A positive outcome of the evaluation unit 140, i.e. PPE being in accordance with the specific PPE requirement 112, may be transferred to the locking mechanism 160 which unlocks the locked door.

Figure 2:
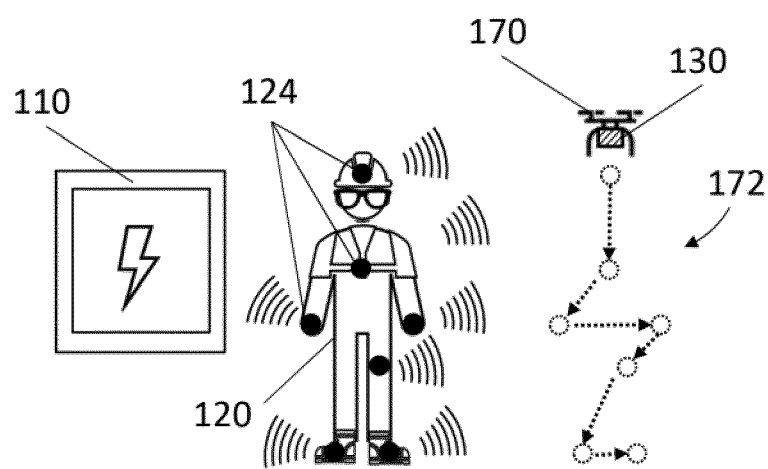
FIG. 2 shows schematically a further system for controlling PPE used in a method according to a second embodiment of the invention.

FIG. 2 shows some aspects of alternative embodiments of the proposed method and system according to the claims.

According to one aspect, an unmanned autonomous vehicle 170 is involved in the proposed method. The unmanned autonomous vehicle 170 may be an unmanned aerial vehicle as illustrated in FIG. 2. However, the unmanned autonomous vehicle may also be an unmanned ground vehicle.

If the person 120 is positioned next to the electrical enclosure 110, the unmanned autonomous vehicle 170 may be commanded to move to the electrical enclosure 110. For example, such command may be an attempt to open the door of the electrical enclosure. In another example, a button may be provided next to the electrical enclosure, wherein pushing the button, commands the unmanned autonomous vehicle 170 to move to the electrical enclosure 110.

The unmanned autonomous vehicle 170 may be equipped with the scanning unit 130. The scanning unit 130 attached to the unmanned autonomous vehicle 170 may scan the PPE 122 of the person 120 in a contact-less manner, as described before.

Similar as before the scanning unit 130 may comprise one or more optical detector(s). In addition, or alternatively, the scanning unit 130 may comprise one or more RFID reader. The RFID reader may be configured to wirelessly receive radio waves transmitted by one or more RFID transponders 124, as illustrated in FIG. 2.

Each RFID transponder 124 may provide a scanning point at the person 120, e.g. a head scanning point, a chest scanning point, hands scanning points, legs scanning points and feet scanning points. For example, the PPE 122 of a person 120 is provided with the one or more RFID transponders 124. For example, each component of the PPE 122 may be provided with one RFID transponder 124. A component of the PPE 122 may be a helmet, an eye protection, a face mask, a glove, a coat, pants or a boot, respectively.

As illustrated in FIG. 2, the unmanned autonomous vehicle 170 may follow a scanning path 172. The scanning path 172 may pass all scanning points. The unmanned autonomous vehicle 170 may keep a safe distance to the person 120.

As described before, scanning unit 130 generates scanned PPE information 132 while scanning the PPE 122. The scanned PPE information 132 may be transferred to an evaluation unit 140. An outcome of the evaluation may be transferred to a feedback unit 150 as described above. The feedback unit 150 may be attached to the electrical enclosure or to the unmanned autonomous vehicle 170, for example.

Figure 3:
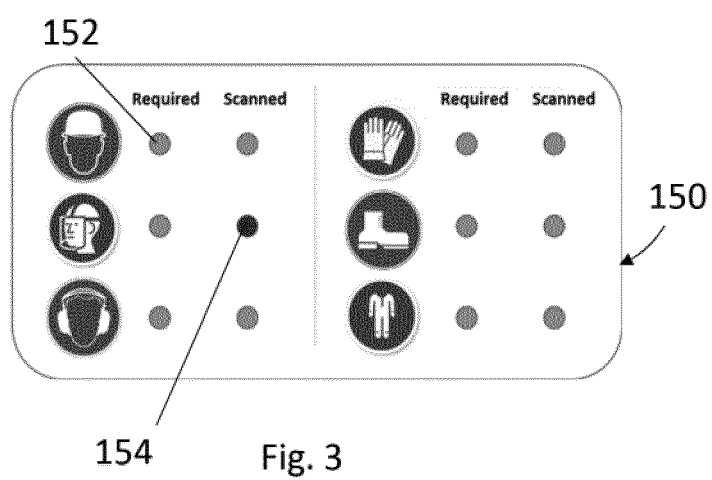
FIG. 3 shows schematically a feedback unit used in the method according to an embodiment of the invention.

According to one aspect, the feedback unit 150 is configured to indicate components of the PPE 122 which are not in accordance with corresponding components required according to the specific PPE requirement 112. For example, the feedback unit 150 may comprise a feedback panel. FIG. 3 illustrates an embodiment of a feedback unit 150 embodied as a feedback panel. For example, the feedback unit 150 may outline components required according to the specific PPE requirement 112 by a first light source 152. For example, a green light may indicate a necessity of the required component. For example, the feedback unit 150 may outline the scanned components of the PPE 122 with a second light source 154. For example, a green light may indicate the presence of the required component, wherein a red light indicates a missing component. For example, the feedback unit 150 in FIG. 3 indicates with first light sources 152 that a helmet, a face mask, headphones, gloves boots and long clothes are required components, respectively. The feedback unit 150 further indicates with second light sources 154 that only a helmet, headphones, gloves boots and long clothes were scanned, wherein a face mask was not scanned. Accordingly, the face mask is a component that is not in accordance with the corresponding component required according to the specific PPE requirement 112.

According to one aspect, the unmanned autonomous vehicle 170 is configured to deliver a component or components of the PPE 122 which are not in accordance with corresponding components required according to the specific PPE requirement 112. For example, the unmanned autonomous vehicle 170 may comprise a casing. For example, with the example of FIG. 3, the unmanned autonomous vehicle 170 may deliver the face mask in the casing to the person 120 next to the electrical enclosure 110.

DESCRIPTION OF FURTHER ASPECTS

Next, various more general aspects of the invention are defined in more detail. Each aspect so defined may be combined with any other embodiment or with any other aspect(s) unless clearly indicated to the contrary. Reference signs referring to the Figures are for illustration only, but are not intended to limit the respective aspect(s) to the embodiments shown in the Figures.

First, aspects regarding the electrical enclosure are described.

According to an aspect, an electrical enclosure is a cabinet for electrical equipment. For example, the electrical enclosure may house the electrical components of a process plant, a machine tool or production equipment that are not directly located in the corresponding machine. For example, the electrical enclosure may house electrically energized components, in particular, medium or high voltage components. For example, the electrical enclosure may be an electrical cupboard or an electrical switchgear.

According to an aspect, the electrical enclosure is configured to prevent electrical shocks and/or to protect electrical equipment from the environment. For example, the electrical enclosure may be made from rigid plastics, composites, or metals such as steel, stainless steel, or aluminum.

According to an aspect, the electrical enclosure is installed outside or inside a building. For example, the electrical enclosure may be a stand-alone electrical enclosure or an electrical enclosure installed on the wall of a building, e.g. of a room.

According to an aspect, the electrical enclosure comprises standardizes dimensions. According to an aspect, the electrical enclosure comprises a width being not smaller than 150 mm and not larger than 1200 mm. According to an aspect, the electrical enclosure comprises a height not smaller than 150 mm and not larger than 2200 mm. According to an aspect, the electrical enclosure comprises a depth not smaller than 80 mm and not larger than 800 mm.

According to an aspect, a person is positioned next to an electrical enclosure. A positioning next to the electrical enclosure comprises a positioning in front of the electrical enclosure, behind the electrical enclosure and/or beside the electrical enclosure. A positioning next to the electrical enclosure may be provided by the person being not more than 5 m distant from the electrical enclosure. A positioning next to the electrical enclosure may be provided by the person being not more than 3 m distant from the electrical enclosure.

An advantage of this aspect is that the control of the PPE takes place in a spatial proximity to the electrical enclosure. This increases the probability that the control is still up-to-date when the person starts working with the electrical enclosure, i.e. the source of risk. The further away the control is from the actual working location, the more likely it may be that the PPE will change in the meantime. For example, if there is a mirror at the entrance of a building, a worker may check that all the PPE is present. However, it is still possible that a component of the PPE will be missing when the worker arrives at the electrical enclosure. For example, the worker may take off the gloves, e.g. due to looking at the watch or because it was too warm, and then forgets to put them on again.

Usually the spatial proximity is accompanied with a temporal proximity as well. Due to the spatial proximity to the electrical enclosures, the control of the PPE may take place just before the person has access to the electrical enclosure. For example, the control may take place within 1 to 120 seconds before the person gets access to the electrical enclosure. A small time slot between the control and the start of working may also significantly increase the probability that the control is still up-to-date when the person starts working with the electrical enclosure.

Accordingly, the proposed method increases the probability that the PPE of a person is in accordance with the specific PPE requirement of the electrical enclosure at the moment where the person actually works at the electrical enclosure.

According to an aspect, the scanned PPE information of the person's PPE is compared with the specific PPE requirement that is defined for the electrical enclosure.

An advantage of this aspect is that an individual control of the PPE may be provided for each electrical enclosure the person is going to work with. This can prevent the person from being equipped with unnecessarily uncomfortable or bulky PPE. For example, there may be different specific PPE requirements for different electrical enclosures in a room. However, if a control of the PPE takes place only at an entrance of the room, to be on the safe side, a person would always have to be equipped with PPE in accordance with the PPE requirement in the room having the highest safety level, to pass the control. For example, a first electrical enclosure in a room may require a face mask wherein a second electrical enclosure in the room may only requires goggles. The person who is going to work only with the second electrical enclosure would not need to be equipped with a face mask, if the control includes only a comparison of the person's PPE with the specific PPE requirement for the second electrical enclosure and not with a PPE requirement for the whole room.

According to an aspect, the method further comprises an automatic recognition of the presence of a person and/or of personal protective equipment next to an electrical enclosure. The automatic recognition of the presence may be accompanied with an automatic initiation of the scanning, evaluating and feedback provision.

An advantage of this aspect is that a time-effective control may be provided. The proposed method may provide an automatized control of PPE in a natural and interactive way which does not require additional education or advanced human-machine interaction from the respective person.

Next, aspects regarding the feedback are described.

According to an aspect, a feedback is provided indicating whether or not the PPE of a person is in accordance with the specific PPE requirement.

An advantage of this aspect is that a feedback may slow the person down for a moment, remind the person about the required PPE and encourage the person to be equipped correctly. For example, safety protocols may not always catch the attention of a person or motivate enough. A feedback right before the person starts working with the electrical enclosure may provide a personal reminder for the person that the PPE is complete and adequate or not.

According to one aspect, the feedback comprises a noise and/or a voice message.

According to one aspect, the feedback comprises a visual feedback. An advantage of this aspect is that especially a visual feedback may not be easily ignored by the person who is going to work with the electrical enclosure.

According to one aspect, the feedback unit comprises a screen. The screen may be attached to the electrical enclosure. For example, the screen may be attached to a door of the electrical enclosure or on top of the electrical enclosure. The screen may also be attached to an unmanned autonomous vehicle. The screen may provide the person with text and/or images indicating whether or not the PPE is in accordance with the specific PPE requirement. For example, the screen may reflect visually the scanned and requested PPE components.

According to one aspect, the feedback comprises providing an image feed (or video feed) of the person positioning next to the electrical enclosure. The screen may further be configured to virtually put missing PPE component on the person, e.g. with augmented reality.

An advantage of this aspect is that the person may be encouraged to actually put on the missing PPE component.

According to one aspect, the feedback unit comprises an interactive transparent screen. For example, the interactive transparent screen may be attached to a door of the electrical enclosure.

According to one aspect, the feedback unit comprises a head covering, e.g. a helmet. The head covering may be provided with augmented reality. A visor of the head covering may indicate a visual feedback.

According to one aspect, the feedback may comprise chronological standard safety steps to follow in order to service the electrical equipment in a safe way. The feedback may also comprise diagnostic information about the electrical equipment housed in the electrical enclosure.

According to one aspect, the feedback comprises unlocking a locked door of the electrical enclosure if the personal protective equipment is in accordance with the specific personal protective equipment requirement.

An advantage of this aspect is that a person may simply not be able to work with the electrical enclosure unless the person is equipped properly.

According to one aspect, the scanning unit and/or the feedback unit is permanently attached to the electrical enclosure. For example, the scanning unit and/or a feedback unit may be on top of the electrical enclosure.

According to one aspect, the scanning unit and/or the feedback unit is portable.

An advantage of this aspect is that the scanning unit and/or the feedback unit can be moved from one electrical enclosure to another electrical enclosure. This may provide a cost-effective method or system even if a lot of electrical enclosures are present.

According to one aspect, the PPE requirement comprises a condition requirement. A condition requirement may define a serviceable condition for the required PPE, e.g. aging of the PPE.

According to one aspect, the scanning is provided by image recognition. For example, the scanning unit may comprise several optical detectors, e.g. cameras. The optical detectors may take images of the person. For example, the optical detectors may take full height images from head till feet of the person that is positioned next to the electrical enclosure. The images may be processed and compared with the specific PPE requirement.

An advantage of this aspect is that it may be ensured that the scanned PPE is not just nearby, but that the person that is positioned next to the electrical enclosure is actually equipped with the PPE.

Next, aspects regarding the usage of unmanned autonomous vehicles are described.

According to one aspect, the method involves one or more unmanned autonomous vehicles. For example, the unmanned autonomous vehicles may be unmanned aerial vehicles or unmanned ground vehicles.

An advantage of this aspect is that the usage of an unmanned autonomous vehicles may be cost-effective, in particular, if a lot of electrical enclosures are present. For example, attaching a scanning unit and/or a feedback unit to each electrical enclosure in a building may be cost-intensive. Combining the proposed method with an unmanned autonomous vehicle may allow to carry out the proposed method with only a few scanning units and/or feedback units which may be attached to one or more unmanned autonomous vehicles. For example, there may be only one unmanned autonomous vehicle equipped with one scanning unit and one feedback unit for one floor of a building.

In addition, carrying out the method with the help of an unmanned autonomous vehicles may be provided without modifying the current generation of electrical enclosures, e.g. by attaching a scanning and/or feedback unit.

In addition, the unmanned autonomous vehicle may be used to deliver, components of the PPE which are not in accordance with corresponding components required according to the specific PPE requirement.

An advantage of this aspect is that the worker may spend time because there is no need to go to a changing room in order to get the missing component.

According to one aspect, the system may further comprise a centralized server.

According to one aspect, the system may further comprise a communication system.

According to one aspect the communication system is a wireless communication system. The communication system may comprise one or more communication units. The communication units may be attached to the electrical enclosure, the unmanned autonomous vehicle and/or the centralized server. The communication system may be configured to provide communication between the electrical enclosure, the unmanned autonomous vehicle and/or the centralized server. For example, the communication system may be configured to provide:

Sending and/or receiving a list of required PPE components;
Sending and/or receiving a list of scanned PPE components;
Reporting that a person is intended to work with a particular electrical enclosure;
Reporting the scanned PPE information;
Reporting occurrence of incidents;
Providing flexible specific PPE requirements in reaction of changes in the environment, e.g. if the voltage occasionally jumped to higher values than what is normally expected;
Reporting how the equipment in the electrical enclosure is currently working;
Reporting diagnostic features;
Reporting alerts; and/or
Reporting recommendations of how the equipment should be used for long lasting life.

According to one aspect, all scanned and/or feed-back information are recorded in an electronic memory. The data may be available to be communicated to any control system or to the centralized server.

According to one aspect, the evaluation unit comprises a processing logic, memory and/or control. For example, the evaluation unit may comprise a microcomputer or a remote server.

As used herein, "attached to" or the like generally include meanings like "connected to", "mounted on", "integrated in", "embedded in" or "incorporated in".

The invention claimed is:

1. A method for controlling personal protective equipment, comprising:
  positioning of a person equipped with personal protective equipment next to an electrical enclosure, wherein a specific personal protective equipment requirement is defined for the electrical enclosure;
upon the positioning of the person next to the electrical enclosure, commanding an unmanned autonomous vehicle to move to the electrical enclosure;
scanning, via a scanning unit attached to the unmanned autonomous vehicle, the personal protective equipment in a contact-less manner while the person is next to the electrical enclosure, thereby generating scanned personal protective equipment information;
comparing the scanned personal protective equipment information with the specific personal protective equipment requirement;
evaluating, based on the comparison, whether the personal protective equipment is in accordance with the specific personal protective equipment requirement; and
providing a feedback indicating whether or not the personal protective equipment is in accordance with the specific personal protective equipment requirement, wherein the feedback is provided by a feedback unit attached to the unmanned autonomous vehicle.

2. The method according to claim 1, further comprising:
unlocking a locked door of the electrical enclosure if the personal protective equipment is in accordance with the specific personal protective equipment requirement.

3. The method according to claim 1, wherein scanning the personal protective equipment includes a visual scanning.

4. The method according to claim 1, wherein scanning the personal protective equipment includes wireless receiving of radio waves transmitted by one or more RFID transponders provided on the personal protective equipment.

5. The method according to claim 1, wherein the feedback comprises a visual feedback.

6. The method according to claim 1, wherein the feedback comprises indicating components of the personal protective equipment which are not in accordance with corresponding components required according to the specific personal protective equipment requirement.

7. The method according to claim 1, further comprising:
automatically recognizing the presence of a person and/or of personal protective equipment next to an electrical enclosure, and initiating the scanning, evaluating and feedback provision automatically upon having recognized the presence.

8. The method according to claim 1, wherein the method further comprises:
delivering, by the unmanned autonomous vehicle, components of the personal protective equipment which are not in accordance with corresponding components required according to the specific personal protective equipment requirement.

9. The method according to claim 1, further comprising:
delivering, by the unmanned autonomous vehicle, components of the personal protective equipment which are not in accordance with corresponding components required according to the specific personal protective equipment requirement.

10. A system for controlling personal protective equipment, comprising:
an electrical enclosure for which a specific personal protective equipment requirement is defined;
an unmanned autonomous vehicle configured to move to the electrical enclosure in response to a command reflecting a positioning of a person equipped with personal protective equipment next to the electrical enclosure;
a scanning unit attached to the unmanned autonomous vehicle, the scanning unit being configured to scan the personal protective equipment in a contact-less manner and to generate scanned personal protective equipment information thereby;
an evaluation unit configured to compare the personal protective equipment information with the specific personal protective equipment requirement and to evaluate, based on the comparison, whether the personal protective equipment is in accordance with the specific personal protective equipment requirement;
a feedback unit attached to the unmanned autonomous vehicle and configured to indicate whether or not the personal protective equipment is in accordance with the specific personal protective equipment requirement.

11. The system according to claim 10, wherein the electrical enclosure comprises a locked door preventing access to the inside of the electrical enclosure as long as the personal protective equipment is not in accordance with the specific personal protective equipment requirement, and
wherein the system further includes a locking mechanism configured to unlock the locked door if the personal protective equipment is in accordance with the specific personal protective equipment requirement.

12. The system according to claim 10, wherein the personal protective equipment includes one or more RFID transponders and wherein the scanning unit includes one or more RFID readers.

13. The system according to claim 10, wherein the scanning unit comprises one or more optical detectors.

14. The system according to claim 10, wherein the feedback unit is configured to provide visual feedback and/or wherein the feedback unit is configured to indicate components of the personal protective equipment which are not in accordance with corresponding components required according to the specific personal protective equipment requirement.

15. The system according to claim 10, wherein the unmanned autonomous vehicle is configured to deliver components of the personal protective equipment which are not in accordance with corresponding components required according to the specific personal protective equipment requirement.

16. The system according to claim 10, wherein the unmanned autonomous vehicle is configured to follow a scanning path passing individual scanning points on the personal protection equipment.

17. A method for controlling personal protective equipment, comprising:
positioning of a person equipped with personal protective equipment next to an electrical enclosure, wherein a specific personal protective equipment requirement is defined for the electrical enclosure;
commanding an unmanned autonomous vehicle to move to the electrical enclosure;
scanning, via a scanning unit attached to the unmanned autonomous vehicle, the personal protective equipment in a contact-less manner while the person is next to the electrical enclosure, thereby generating scanned personal protective equipment information;
comparing the scanned personal protective equipment information with the specific personal protective equipment requirement;
evaluating, based on the comparison, whether the personal protective equipment is in accordance with the specific personal protective equipment requirement; and providing a feedback indicating whether or not the personal protective equipment is in accordance with the specific personal protective equipment requirement;
wherein said scanning the personal protective equipment comprises commanding the unmanned autonomous vehicle to follow a path passing individual scanning points on the personal protection equipment.

\* \* \* \* \*